April 30, 1968 W. J. HOLM 3,380,130
OSCILLATING SHEARING APPARATUS
Filed Sept. 27, 1965 2 Sheets-Sheet 1

INVENTOR.
WILLIAM J. HOLM
BY
Marro, Altman & Oates
ATTORNEYS

United States Patent Office 3,380,130
Patented Apr. 30, 1968

3,380,130
OSCILLATING SHEARING APPARATUS
William J. Holm, Springfield, Vt., assignor to Parks & Woolson Machine Company, Springfield, Vt., a corporation of Vermont
Filed Sept. 27, 1965, Ser. No. 490,599
1 Claim. (Cl. 26—15)

ABSTRACT OF THE DISCLOSURE

A shearing apparatus is provided for cutting to a uniform height the upstanding threads of a cloth web which is moved longitudinally over a fixed rest. The apparatus comprises a torsion system which supports shearing blades and fixed ledger knives extending into proximity with the shearing blades and the rest. The torsion system is driven by an oscillating drive system whereby the shearing blades are oscillated back and forth and, in cooperation with the fixed ledger knives, shear the cloth.

---

This invention relates generally to cloth shearing machines and more particularly is directed towards an oscillating shearing apparatus for use in shearing protuding fibres from the cloth surface to a uniform height.

In the manufacture of many types of fabrics it is the practice to feed the material in open width form through cloth shearing machines in order to shear the surface threads to a uniform length. The shearing mechanism now in use customarily employ a cylindrical shearing revolver having a number of cutting elements disposed thereabout which coact with a stationary rest and ledger knife to shear off the upstanding fibres. The rotating revolvers while satisfactory at relatively low operating speeds undergo certain distortions at high speeds. These distortions produce an uneven shearing action on the cloth. Furthermore, with conventional shearing revolvers of extended lengths for shearing wide carpeting, for example, there is a considerable amount of sagging across the center of the revolver insofar as the revolver rotates on only two bearings. In addition, present shearing revolvers are somewhat difficult and expensive to fabricate and maintenance of the shearing blades involves relatively frequent grinding and honing during which time the shearing machine is out of operation.

Accordingly, it is an object of the present invention to provide improvements in cloth shearing machines.

Another object of this invention is to provide a cloth shearing mechanism which may be made in extended lengths for use with wide fabrics without sag or deflection.

A further object of this invention is to provide a cloth shearing mechanism of low cost light weight construction capable of high operating speeds.

More particularly this invention features a cloth shearing mechanism, comprising an elongated support, shearing knives extending outwardly from the support and power means connected to said support for oscillating the support about its longitudinal axis. The cutting elements cooperate with a stationary rest and one or more ledger knives to provide shearing action for a cloth web moving over the rest.

Figure 1:
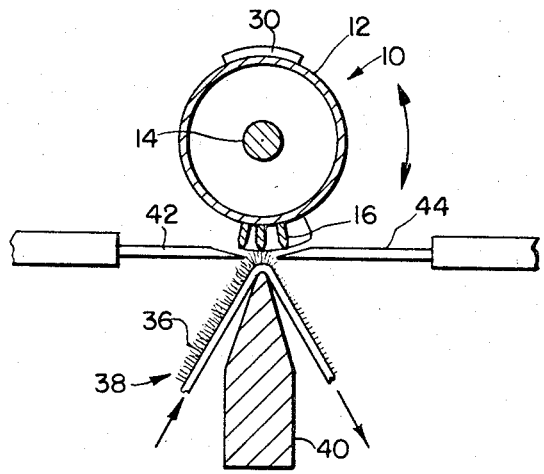
Figure 2:
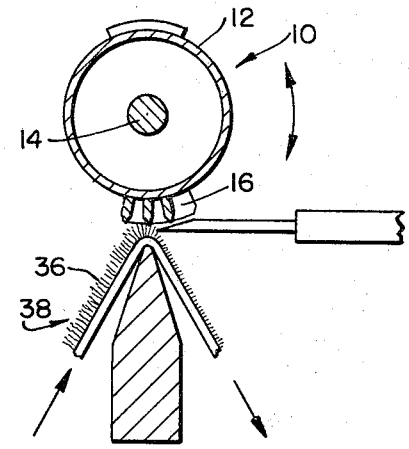
Figure 3:
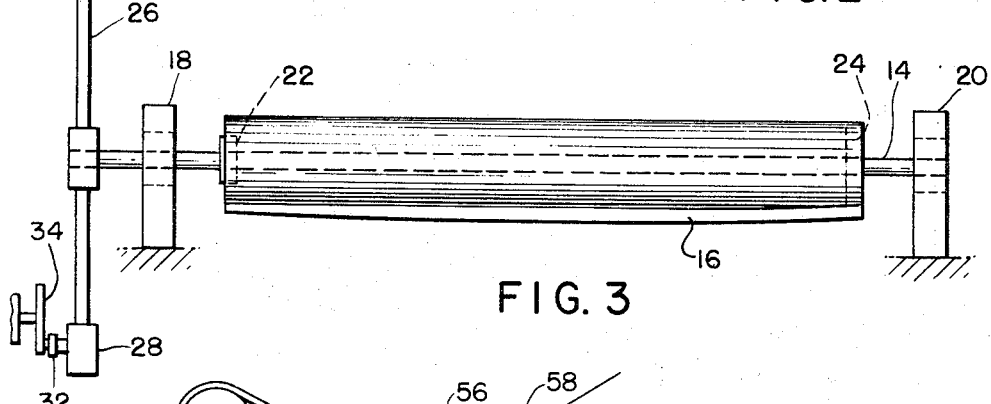
Figure 4:
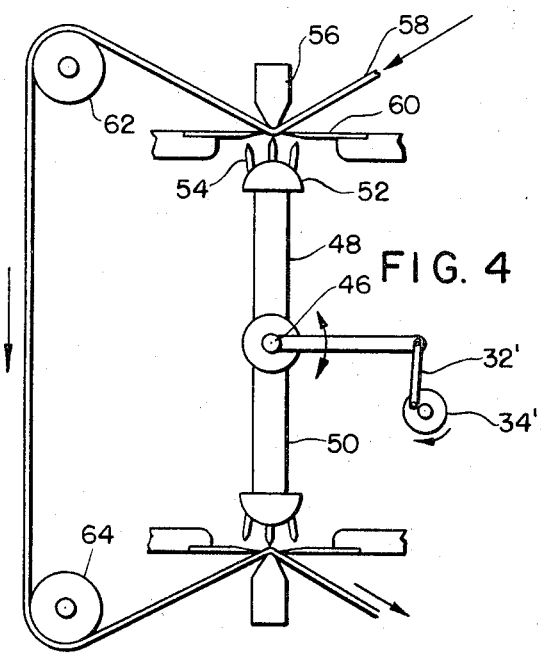
Figure 5:
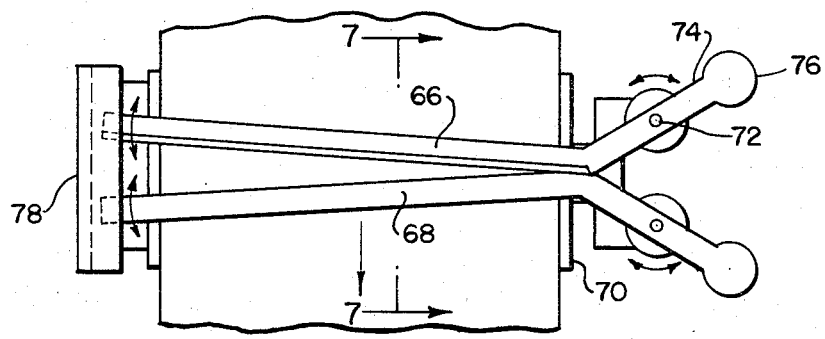
Figure 6:
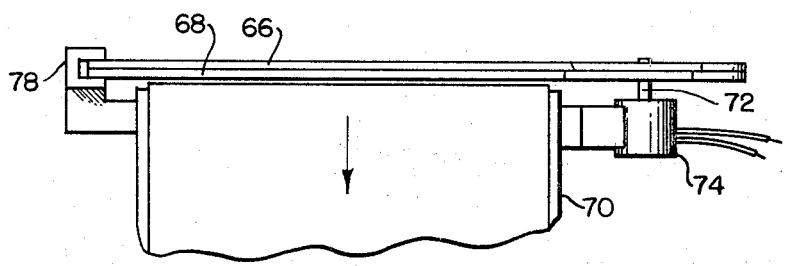
Figure 7:
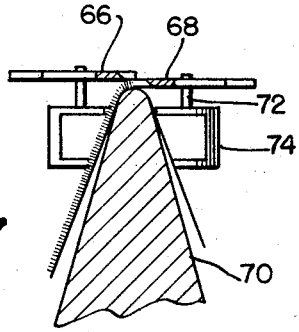
Figure 8:
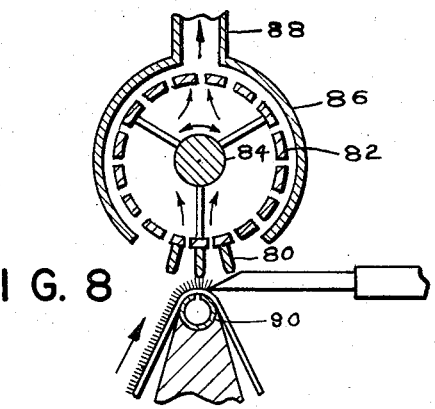

However, these and other features of the invention, along with further objects and advantages, thereof, will become more fully apparent from the following detailed description of preferred embodiments of the invention, with reference being made to the accompanying drawings, in which:

FIG. 1 is a sectional side elevation of a shearing mechanism made according to the invention, FIG. 2 is a view similar to FIG. 1 but showing a modification thereof, FIG. 3 is a front elevation of a shearing mechanism made according to the invention, FIG. 4 is a somewhat schematic side elevation, partly in section, of a modification of the invention, FIG. 5 is a top plan view of another modification of the invention, FIG. 6 is a front elevation of the FIG. 5 embodiment, FIG. 7 is a side elevation thereof partly in section, and FIG. 8 is a sectional side elevation of a further modification.

Referring now to the drawings and to FIGS. 1 and 3 in particular, the reference character 10 generally indicates a shearing head comprising an elongated cylindrical torque tube 12 concentrically mounted about a torsion bar 14. Fixed on the outer cylindrical surface of the tube 12 are spaced cutting blades 16 of perhaps three in number and extending the length of the tube preferably in a slight spiral configuration for reasons which will presently appear. Typically the blades are formed from hardened steel or a steel alloy capable of holding a sharp cutting edge for an extended period. In the FIG. 1 embodiment, the front and rear edges of each blade should be ground to a cutting edge insofar as both edges will be employed in shearing.

The torque tube 12 is adapted to be oscillated about its logitudinal axis by a drive system which includes the torsion bar 14 rotatably supported by bearings 18 and 20. The torsion bar passes coaxially through the tube 12 and is maintained in spaced relation to the tube at the left-hand end by means of a sleeve or ball bearing 22. At the right-hand end of the tube the torsion bar is rigidly connected to the tube by means of a flange 24.

Fixed to the extreme left-hand end of the torsion bar 14 as shown in FIG. 3 is an inertia element 26. The moment of inertia of the element 26, with weights 28 at each end, may be conveniently chosen to be the same as the inertia of the combination consisting of the cutting blades 16 and the torque tube 12. In practice, it may be desirable to add a counterweight 30 to the torque tube 12 diametrically opposite the cutting blades to dynamically balance the system. When a sinusoidally oscillating force is applied to the end of the torsion shaft 14 at the point where it is secured to the inertia element 26, the inertia element 26, will oscillate torsionally about the axis of the torsion bar and in so doing will twist the torsion bar.

The drive system is more fully described in U.S. Patent No. 2,741,111 and constitutes a torsionally resonant system having two degrees of freedom. That is, during oscillation the inertia element 26 is oscillated at the same frequency as the assembly but in the opposite direction when the oscillating torque is being applied to the end of the torsion shaft which has the same frequency as the natural period of the system. Thus when the inertia element 26 is moving counter-clockwise the tube is moving clockwise and vice versa.

The required sinusoidally oscillating torque may be applied to the inertia element 26 by a crankshaft connecting rod 32 connected to one end of the inertia element and to a constant speed rotating eccentric 34. It will be understood that as the eccentric 34 turns it will transmit a reciprocating motion through the connecting rod to the inertia element causing the inertia element to oscillate about the axis of the torsion rod, twisting the rod and transmitting the oscillating angular movement to the tube which in turn will cause the cutting blades 16 to oscillate back and forth in an arc. In practice, a displacement of the blades on the order of 1½″ or so may be obtained and this displacement may be varied depending upon the torsional characteristics of the shaft and the driving assembly.

In place of the oscillating drive mechanism illustrated, similar effects may be achieved by employing the driving apparatus disclosed in U.S. Patent No. 2,939,223. This patent discloses an electrically driven oscillating system that is capable of a higher oscillating frequency.

In any event the oscillating blades 16 are employed to shear upstanding fibres 36 from a moving web 38. The web 38 is carried over a rest 40 which may be movably mounted to or away from the shearing head to accommodate webs of different thicknesses. The top portion of the rest is located oppositely the cutting blades 16 and located to either side of the rest are ledger knives 42 and 44. The ground edges of the ledger knives extend into the gap between the rest and the shearing blades and typically are spaced about 1½" from one another to allow the projecting fibres to move into the gap to be shorn. Insofar as the ledger knives are located to either side of the shearing head there will be a shearing stroke and cutting action in both directions as the shearing head oscillates. By forming the cutting blades into a slight spiral at least one of the cutting blades is always contacting the ledger knife. In practice, the ledger knives may be mounted for adjustment to or away from one another so as to provide the optimum cutting action for the particular cloth which is being shorn. With vibrating action on the order of 7,000 cycles/minute very satisfactory shearing action is obtained especially on napped, pile fabrics, carpets and the like.

The oscillating shearing head offers a number of advantages over conventional rotating shearing heads. For example, the oscillating shearing head does not rotate so that there are no problems of centrifugal force at high speeds. With conventional revolvers a high operating speed causes distortion of the revolver producing an uneven cutting action across the width of the cloth. Also the oscillating shearing head may be made up in relatively great length for use in shearing wide material such as carpeting and the like. Conventional revolvers are relatively heavy and rotate on only two bearings. Elongated revolvers thus tend to sag or deflect and this becomes pronounced at high rotational speeds. No such problems are present with the oscillating shearing head. A further advantage is that only a small number of cutting blades are required to accomplish the shearing action as compared to the relatively large number of blades needed in a conventional revolver. With the limited number of cutters it is thus practical to use special alloy metals of high hardness in the cutting elements. Also maintenance of the oscillating shearing head is reduced to a minimum insofar as sharpening and honing the blades may be completed quickly and easily because of the reduced number of blades. Insofar as the oscillating cutter in FIG. 1 provides a double shearing action, the results of the shorn fabric are superior to those available with the conventional revolver.

Referring now to FIG. 2 there is illustrated a modification of the invention and in this embodiment only a single ledger knife 44 is employed instead of the two shown in the principal embodiment. The single knife may best be employed on high pile fabrics moving at relatively slow speeds while for fast or more efficient operation the two ledger knives should be employed in order to obtain the double shearing action.

Referring now more particularly to FIG. 4 there is illustrated a further modification of the invention and in this embodiment a torsion bar 46 carries a pair of radially extending arms 48 and 50 each of which carries a shearing head 52. Each shearing head provides an arcuate surface on which are mounted spiral cutters 54 similar to the cutters 16 in FIG. 1. Associated with each shearing head and set of cutting blades is a rest 56 over which a cloth web 58 moves and one or two ledger knives 60 which coact with the cutting elements to shear the fabric fibres.

With this arrangement the cloth 58 may be fed into shearing contact with the upper shearing head shown in FIG. 4 for one shearing operation and then roven over idler rolls 62 and 64 into shearing contact with the lower shearing head of FIG. 4 to undergo a second shearing operation. It will be understood that the torsion bar 46 will be oscillated in a manner similar to the torsion bar 14 of the principal embodiment so as to cause the two shearing heads to oscillate back and forth and thus produce the desired shearing action. With the FIG. 4 arrangement a single oscillating drive unit is capable of performing repeated shearing operations on a single web, or two separate webs may be fed past each of the shearing heads as desired. Additional radial arms and shearing heads may be added to the torsion bar for further shearing capability. It will be understood, however, that each shearing head would be provided with a rest and one or two ledger knives as desired.

Referring now to FIGS. 5, 6 and 7, there is illustrated a further modification of the invention and in this embodiment two arms 66 and 68 are mounted above a rest 70 and are adapted to oscillate to and away from each other in a shearing action. The opposing edges of the arms are ground so that the fibres will be cut as the arms close against one another.

Each arm is fixed to an upright torsion bar 72 which is oscillated by a drive 74 such as shown in U.S. Patent 2,939,223. Each arm is dynamically balanced by a counterweight 76 and the free end is supported in a guide block 78. Operation of the drive 74 will oscillate the torsion bar 72 causing the arm to oscillate over the cloth and against the other arm to provide the desired shearing action.

In FIG. 8 there is shown another modification of the invention and in this embodiment spiral cutting strips 80 are mounted on a core 82 in a manner similar to the FIG. 1 embodiment. However, in this instance the core 82 is of an openwork or skeleton construction and mounted on a central torsion bar 84 for oscillation about its axis.

The purpose of the openwork core is to permit the flow of air through the core when an updraft is created as by suction to raise the fibres along the shearing line for optimum efficiency. In practice, a hood 86 may enclose the core with the exception of the cutting strips 80 and the hood may be connected by a duct 88 to a vacuum source.

As an alternative arrangement a slit tube connected to a vacuum source may be mounted through the core below the torsion bar and above the cutting strips. Or, compressed air may be directed through the web to raise the fibres. This may be done by a slit tube 90 mounted in the rest and having its slit directed upwardly. The tube, of course, is connected to a source of compressed air and may be used alone or in conjunction with the vacuum hood to raise the fibres.

While the invention has been described with particular reference to the illustrated embodiments, it will be understood that numerous modifications thereto will appear to those skilled in the art. Accordingly, the above description and accompanying drawings should be taken as illustrative of the invention and not in a limited sense.

Having thus described the invention what I claim and desire to obtain by Letters Patent of the United States is:

1. Apparatus for shearing fibers on the surface of a moving web, comprising in combination,
   (a) a fixed rest adapted to support said web,
   (b) a pair of fixed ledger knives mounted adjacent said rest and on either side thereof transversely of said web and in position to engage said fibers,
   (c) an elongated cylindrical torque tube mounted opposite said rest transversely of said web and coextensive therewith,
   (d) a plurality of closely adjacent elongated shearing elements coextensive with said tube and mounted generally lengthwise along the outer cylindrical surface thereof and cooperating as a unit with each of said knives, said shearing elements being normally centrally disposed with respect to said ledger knives, (e) a torsion bar extending from one end of said tube telescopically therethrough coextensive with said tube and drivingly connected to the opposite end thereof,
(f) oscillating torque drive means connected to said torsion bar for torsionally twisting said bar in alternating directions about its longitudinal axis whereby said tube with said shearing elements is oscillated about the axis of the bar to and away from said knives, each of said shearing elements cooperating with each of said ledger knives to shear said fibers.

References Cited

UNITED STATES PATENTS

| | | | |
|---|---|---|---|
| 2,741,111 | 4/1956 | Smith | 68—175 |
| 2,939,223 | 6/1960 | Smith | 34—58 |

FOREIGN PATENTS

| | | |
|---|---|---|
| 2,182 | 8/1822 | France. |
| 4,691 | 4/1822 | Great Britain. |

ROBERT R. MACKEY, *Primary Examiner.*